Patented Apr. 14, 1931

1,800,501

UNITED STATES PATENT OFFICE

CARL BÖHM v. BÖRNEGG, OF FRANKFORT-ON-THE-MAIN, GERMANY, ASSIGNOR, BY MESNE ASSIGNMENTS, TO CALIFORNIA FRUIT GROWERS EXCHANGE, OF LOS ANGELES, CALIFORNIA, A CORPORATION OF CALIFORNIA

METHOD OF DRYING FRUIT JUICES

No Drawing. Application filed February 27, 1925, Serial No. 12,188, and in Germany March 24, 1924.

It is known that by drying liquids of plant, animal, and synthetic origin, such as fruit juices, by the method known as spray drying, that is, by atomizing the liquid in a current of heated air or gas and collecting the resulting finely divided suspended solid products, for instance by settling, filtration, or electrical precipitation, the solid particles tend to coalesce into tough slimy adherent masses which are difficult to remove from the drying and collecting apparatus. This is due to the fact that the dissolved solid substances in the liquids deposit in amorphous condition and are therefore soft or gummy and hygroscopic. If under some circumstances a dry friable mass or powder is produced, it is ordinarily so hygroscopic that it is very difficult to preserve, absorbing moisture from the air and becoming a viscous or sticky mass.

Many attempts have been made to overcome these difficulties, including the addition of materials such as malt extract and glucose to the liquids prior to the evaporation thereof, but the results were not entirely satisfactory. As a rule such materials must be added to the liquid to be evaporated in such large quantities as to completely change the character, particularly the taste, of the product. Also the rate of evaporation of the liquid is greatly reduced.

It has been found that the difficulties referred to can be overcome by the addition to the liquids to be evaporated of comparatively small amounts of water soluble gums such as gum arabic, tragacanth, agar-agar and the like. These gums in pure form and suitably diluted, that is, constituting only a small proportion of the product do not affect its taste and do not materially affect the evaporation of the liquids.

By the use of only small amounts of the gums referred to beautiful dry powders may be obtained from fruit juices and the like, which powders are easily removed from the drying apparatus and are comparatively stable. This is regarded as a surprising result, since it was not to be expected that materials commonly regarded as agglutinants used in such small proportions would be capable of producing the effects described. On the contrary, it was to be expected that a more adhesive or gummy product would be obtained.

The following is an illustrative example:

About 20 grams of pure gum arabic are dissolved in 1000 grams of lemon juice and the mixture atomized into warm air and the solid products collected in the well known way. A fine dry yellowish-white powder is produced.

The proportion of gum added to the liquid to be evaporated of course is variable within a considerable range, the quantity required to give desired results varying also for different liquids, depending upon the nature of the solid product. The correct quantity of the gum to be used in any particular liquid is readily determined.

I claim:—

1. In processes for the production of solid concentrates from liquids of animal, vegetable and synthetic origin by evaporation, the step which consists in adding to the liquid to be evaporated a small proportion of a water-soluble gum.

2. In the process for the production of powders from liquids of animal, vegetable and synthetic origin by the procedure known as spray drying, the step which consists in adding to the liquid to be evaporated a relatively small amount of a water-soluble gum.

3. In the process for the production of powders from fruit juices by the procedure known as spray drying, the step which consists in adding to the juice to be evaporated a relatively small amount of a water-soluble gum.

4. In the process for the production of a dry powder from fruit juices by the procedure known as spray drying, the step which consists in adding to the juice to be evaporated about 2% of gum arabic.

5. As a new product, a dry powder consisting essentially of the solid constituents of a fruit juice and a relatively small proportion of a water-soluble gum.

6. As a new product, a dry powder consisting essentially of the solid constituents of a fruit juice and a relatively small proportion of gum arabic.

7. A process of making dehydrated fruit juice products containing a large proportion of fruit juice solids and a substantially minor proportion of a gum-like hydrophilic colloid comprising dissolving in fruit juice an edible gum-like hydrophilic colloid for the purpose of rendering the product relatively non-hygroscopic when dry and then drying the mixture of juice and colloid.

8. A dry food product comprising a large proportion of fruit juice solids and a substantially minor proportion of an edible gum-like hydrophilic colloid which renders the product relatively non-hygroscopic.

In testimony whereof, I affix my signature.

CARL BÖHM v BÖRNEGG.